VOLTAGE CONTROLLED MAGNETIC SYSTEM
Filed July 27, 1960
FIG. I.
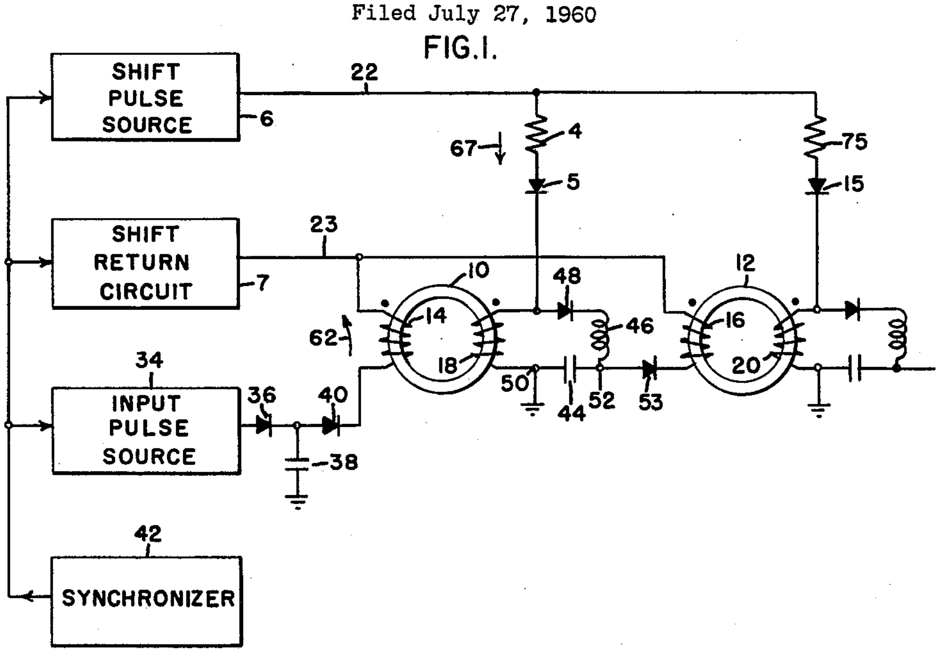
FIG. 2.
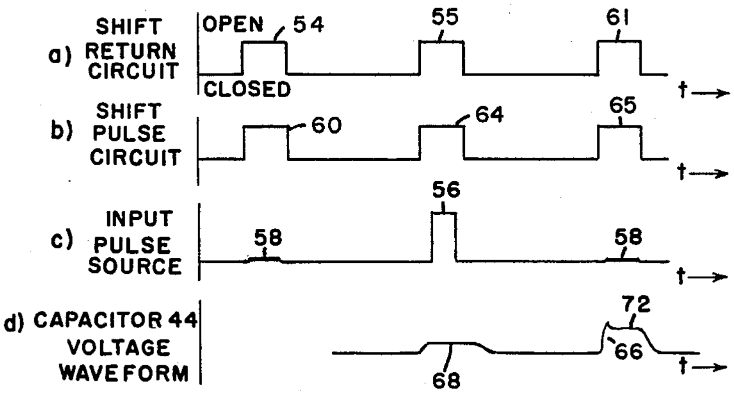
INVENTOR:
BURTON F. WAGNER,
BY Walter C. Bernkopf
HIS ATTORNEY.

United States Patent Office 3,134,966
Patented May 26, 1964

3,134,966

VOLTAGE CONTROLLED MAGNETIC SYSTEM

Burton F. Wagner, North Syracuse, N.Y., assignor to General Electric Company, a corporation of New York Filed July 27, 1960, Ser. No. 45,644
3 Claims. (Cl. 340—174)

This invention relates to magnetic systems capable of representing binary information by the residual flux density of magnetic elements and, more particularly, to such systems useful as shift registers.

Shift registers employing a number of magnetic elements are well known in the art. Magnetic elements having a substantially rectangular hysteresis loop characteristic are generally employed so that binary information can be stored in the magnetic element in one of two states indicative of the information input to the element. In shift registers employing such magnetic elements the binary information input is generally applied to a first magnetic element and then shifted by means of a shift pulse input to consecutive elements, and an intermediate storage network is usually interposed between the successive elements for the purpose of delaying the binary information input to succeeding cores until after the occurrence of the shift pulse. In such systems the shift pulse saturates the magnetic element in one direction while the binary information input signal causes a saturation in the opposite direction. Thus where the input pulse has saturated the magnetic element in one direction, the subsequently applied shift pulse reverses the flux so as to generate a voltage output that after storage in the intermediate storage network is applied to the subsequent magneic element as an indication of an information signal.

Prior art shift registers have generally required current pulses to perform the shifting operation. Such systems have been limited to relatively low shift frequencies partially in view of the difficulty of designing current pulse power supplies which are adapted for high frequency operation. Voltage controlled shift registers, employing voltage pulse to perform the shift operation, obviate many of the difficulties of current controlled shift registers. Such voltage controlled shift registers are disclosed in applications for Letter Patent entitled "Voltage Driven Magnetic Core System," Serial No. 795,811, filed February 26, 1959, by J. R. Horsch, and "Voltage Controlled Magnetic System," Serial No. 811,398, filed May 6, 1959, by the present applicant, and now Patent No. 3,112,471. These applications, which are assigned to the assignee of the present application and are hereby incorporated by reference, disclose registers having a plurality of advantages including: (1) simple and compact construction, since the registers have only one core per bit and two windings per core; (2) low energy loss and high frequency operation, since the registers need utilize only a small area of the hysteresis loop by virtue of "partial looping," i.e. operation between flux levels where at least one flux level is smaller than the retentive flux level resulting from core saturation; and (3) the utilization of low impedance voltage generators as shift pulse sources.

One object of this invention is to provide an improved voltage controlled shift register circuit capable of operation with uni-potential voltage pulses and without bias sources.

Another object of this invention is to increase the pulsing efficiency and flexibility of the voltage controlled shift register without increasing appreciably the complexity of the pulse source.

It is a further object of this invention to provide an improved shift register whose output pulse duration may be increased without requiring increased amounts of input energy.

Briefly, in accordance with one embodiment of this invention, a shift register is provided which comprises a plurality of magnetic elements each adapted to represent the two possible states of a binary coded bit by two distinct reference levels of flux density therein. A primary and a secondary winding is placed on each element and a source of voltage pulses is connected across each of the secondary windings through separate impedance means. Energy storage means are coupled in parallel across each of the secondary windings, and are discharged through the primary winding of the succeeding element upon the actuation of serially connected gating means.

For a better understanding of the invention reference is made to the following description taken in connection with the accompanying drawings and the appended claims wherein, FIG. 1 illustrates schematically one embodiment of the invention; and FIG. 2 is a plot of voltage waveforms at various parts of the circuit of FIG. 1 to a common time base in which voltage is plotted along the axis of ordinates and time is plotted along the axis of abscissa.

In FIG. 1 there is shown a shift register having cores 10 and 12 with respective primary windings 14 and 16 and respective secondary windings 18 and 20 wound thereon. Only two cores are shown for simplicity, but any number may be employed to handle the requisite number of bits in the binary-coded message. The cores may be made from any magnetic material having a substantially rectangular hysteresis loop but are preferably made of magnetic tape wound into a toroidal core. In some applications ferrites may be employed, but in most applications the desired limitation of magnetic flux handled by each core would make the physical size of a ferrite core impractical to construct.

In the disclosed embodiment the shift pulses, also referred to as voltage pulses, are applied to the secondary windings of the cores and the input signal is applied to the primary winding of a first one of the cores. Signal storage networks including a storage capacitor are connected in circuit across the core secondary winding across which the signal output appears and are discharged through a circuit including the primary winding of the subsequent core.

One terminal of each secondary winding is connected to ground. Thus one end of secondary windings 18 and 20 is connected to ground and the other terminal of each secondary winding is connected through separate serially connected rectifier and impedance circuits to the shift pulse bus 22, which in turn is connected to the shift pulse source 6. Thus the other end of secondary winding 18 is connected to shift bus 22 through diode 5 and impedance 4, and the other end of secondary winding 20 is connected to the shift bus through diode 15 and impedance 75. The shift pulse source 6 is the equivalent of a single pole single throw switch which when actuated applies a potential to the shift pulse bus 22.

The input bit information supplied by source 34 is applied through a unidirectional conducting device such as diode 36 to the intermediate storage element capacitor 38. The stored information on capacitor 38 is coupled through a unidirectional conducting device, such as diode 40, to one end of a primary winding 14, of the first core, 10. The other end of the primary winding of each of the cores is connected through bus 23 to the shift return circuit 7. The shift return circuit acts as a switch which when energized completes the current path through the primary windings, and thus completes the discharge path of capacitor 38 through the primary winding 14 at selected periodic intervals. A synchronizer circuit 42 synchronizes the time relationship between the input pulses, the shift pulses and the shift return circuit.

An output and storage circuit is provided intermediate sucessive cores to transfer information to successive digit positions in the shift register. This circuit comprises the capacitor 44, inductor 46, and a unidirectional conducting device, such as diode 48, serially connected across the secondary winding 18 of the first core 10. One terminal, 50, of the capacitor 44 is grounded and the other terminal, 52, is connected through a unidirectional conducting device, such as diode 53, to one end of the primary winding 16 of the second core, 12. Capacitor 44 serves as the intermediate storage element between cores 10 and 12 and serves a similar operating function in respect to core 12 as capacitor 38 does in respect to core 10.

The operation of the circuit is best explained by simultaneous reference to FIGS. 1 and 2. FIG. 2 illustrates signals developed in the circuit of FIG. 1 plotted to a common time scale.

Binary information signals are supplied by the input pulse source 34. For the purpose of explanation a binary bit state "1" is represented by a positive pulse, such as pulse 56 shown in FIG. 2*c*, while a binary bit state "0" is indicated by the absence of a pulse, such as is indicated by the darkened lines 58 in FIG. 2*c*.

The magnetic flux level of each core periodically represents the digit of the last applied binary information bit from the preceding signal source. Thus the flux level of core 10 represents the last applied bit signal subsequent to the application of that signal by input pulse source 34. For purposes of explanation, the "0" state is represented by a retentive core flux which is the residual core flux remaining after the application and removal of a coercive force sufficient to establish saturation flux density in the core. The "1" state may be represented by any other residual core flux as determined by the amplitude and duration of the information pulses. This may be a retentive flux in the direction opposite to that retentive flux representing the "0" state, or may be a flux intermediate the two saturation levels.

In the illustrated embodiment successive information bits from source 34 are supplied in time synchronism with successive shift pulses. Since the shift pulses and information pulses should be applied to the core at separate time intervals, the input pulses are stored on capacitor 38 and are applied through the primary winding 14 subsequent to the termination of the shift pulse. If the input pulse source is synchronized to supply input signals after the termination of the shift pulses, capacitor 38 and diode 36 may be eliminated. Diode 36 prevents discharge of the capacitor through the input pulse source. The storage of the information pulse on capacitor 38 is insured through the coaction of diode 40 and the shift return circuit 7. The shift return circuit may be in the form of a simple transistor switch which is open during the application of the shift pulse and closed during some other interval (as labeled in FIG. 2*a*) or it may be a simple device providing two voltage states, such as a positive voltage during the application of the shift pulse which prevents current flow through diode 40, and a more negative voltage during the absence of the shift pulse which permits a discharge of capacitor 38.

Each shift pulse, applied through impedance 4 and diode 5 to secondary winding 18, establishes a current in the secondary winding of sufficient magnitude to assure that core 10 is set to the retentive flux level, representing a "0" state. At the termination of the shift pulse and closure of the shift return circuit a charge stored on capacitor 38 by a prior input pulse representing a "1" state will discharge through the primary winding 14 in the direction indicated by arrow 62. The resulting current will set the core 10 to a residual value of flux different from the retentive level associated with the "0" state. If the charge is sufficient, the core will be set to a retentive flux density in the direction opposite to that associated with a "0" state, whereas if this charge is controlled to be below this level the core will be set to a flux density intermediate the retentive flux density levels.

For purposes of explanation, FIG. 2 illustrates a hypothetical waveform sequence in which a "0"–"1"–"0" binary information signal is applied from source 34. The first information bit having a "0" state occurs at the time of the first illustrated shift pulse 60. The second information bit having a binary "1" state occurs at the time of a second shift pulse 64, with pulse 56 being applied to storage capacitor 38 simultaneously with the application of shift pulse 64 to the secondary windings.

Since no input pulse is applied to capacitor 38 at the time of shift pulse 60, core 10 retains the retentive level associated with the "0" state. When the subsequent shift pulse, 64, causes a current 67 in impedance 4, diode 5, and secondary winding 18, relatively little energy will be applied to secondary winding 18, since the core 10 already has a retentive level corresponding to such a current flow. Because of impedance 4 a negligible potential will appear across secondary winding 18 and substantially no charge is accumulated on capacitor 44.

Since the magnetic characteristics of core materials depart somewhat from the idealized rectangular hysteresis loop, a small output voltage will be generated across the secondary winding when the shift pulse is applied even though retentive flux density in the same direction is present in the core. A typical output voltage is shown as waveform 68 which represents the voltage appearing across capacitor 44 during the second shift pulse 64, assuming that the register is initially cleared. The inductor 46 serves to attenuate greatly these spurious signal spikes without interfering with the charging of the capacitor by a proper output voltage which is of longer duration.

Subsequent to the termination of shift pulse 64 the shift return circuit 7 is closed so as to provide a discharge path for capacitor 44 through diode 53 and primary winding 16 on core 12. The potential on capaictor 44, corresponding to a "0" bit, is, however, insufficient to alter the retentive flux density in core 12, that was applied by shift pulse 64.

Subsequent to the termination of shift pulse 64, and closure of the shift return circuit 7, the potential on capacitor 38 induced by input pulse 56 is discharged through primary winding 14 on core 10. The resulting current 62 is sufficient to switch the core 10 to its second flux density level. When the subsequent shift pulse 65 is applied, current 67 applies sufficient energy through secondary winding 18 to switch the flux density of core 10 back to the retentive level. This results in a positive potential on secondary winding 18 which is applied through diode 48 and inductance 46 to charge capacitor 44. The resulting waveform on capacitor 44 is shown as 66 in FIG. 2*d*. The voltage rises to a peak and then drops slightly because of a discharge of the capacitor through the secondary winding before diode 48 has sufficiently recovered. After the reverse recovery time of diode 48, the capacitor voltage is constant as illustrated at 72, since the diode 48 and the shift return circuit prevent discharge from the capacitor.

After the termination of shift pulse 65, the shift return circuit is actuated to permit the capacitor 44 to discharge through the primary winding 16 of core 12. The current flow sets core 12 to transfer thereto the bit state information previously stored in core 10. Thus, the information bit is shifted to various positions in the register.

Diodes 5, 15, 40 and 53 function to decouple the various parallel connected stages in the shift register and thus prevent excess current drain and improper system operation.

Diodes 5 and 15 prevent undesired loop currents through the secondary windings. When an information signal induces current flow through a primary winding, transformer action of the core tends to induce a potential in the secondary winding of the core. If a closed loop current were to result from this secondary winding potential, a portion of the input signal energy would be wasted. For example, the potential induced on secondary winding 18, by discharge of capacitor 38 through primary winding 14, could, barring diodes 5 and 15, induce a loop current through impedances 4 and 75 and secondary winding 20. Such a loop current would also be undesirable because it might improperly set the core 12 associated with winding 20. Similar loops with other secondary windings could generate discharge currents from secondary winding 18 and, additionally other secondary windings could similarly generate loop currents. Since diodes 5 and 15 are connected back-to-back in the above discussed loop arrangement, one diode will always block circulating current in the loop. Similarly no loop currents can exist in the secondary windings of any of the cascaded stages because of the back-to-back diode arrangement in any potential loop. Since the shift pulse source 6 presents a high impedance in the absence of the shift pulse no currents exist in the loop including the shift pulse bus 22 and the shift pulse source 6.

Diodes 40 and 53 prevent similar loop currents involving such paths as the one including components 38, 40, 14, 16, 53, 44 and common ground.

It should be noted that the present arrangement requires only unidirectional current flow in the shift pulse source 6. This permits simplification of shift pulse source circuitry over prior systems in which the input source current was discharged through the shift pulse source and thus required the shift pulse source to accommodate bidirectional current flows. In addition the system does not require any fixed bias sources.

An example of the electrical characteristics and the components of a shift register constructed in accordance to the above-described embodiment is given below. These characteristics and components are exemplary only and the invention is not intended to be limited in anyway thereto.

| | |
|---|---|
| Core (10 and 12) | Tape wound bobbin core 10 wraps of 1/8 mil 4–79 Mo-Permalloy tape 1/32 inch wide. |
| Bobbin inside diameter | 0.100 inch. |
| Bobbin outside diameter | 0.140 inch. |
| Bobbin groove diameter | 0.110 inch. |
| Bobbin groove width | 0.040 inch. |
| Bobbin overall (height) | 0.060 inch. |
| Primary winding (14 and 16) | 100 turns. |
| Secondary winding (18 and 20) | 200 turns. |
| Capacitor (38 and 44) | 1,000 $\mu\mu$f. |
| Inductor 46 | 330 $\mu$henries. |
| Diodes 5, 15, and 48 | Hughes 1N118. |
| Diodes 40 and 53 | Hughes 1N116. |
| Diode 36 | Hughes 1N116. |
| Resistors 4 and 75 | 470 ohms. |

The above-described circuit operated at rates up to 200 kilocycles per second at which the register had a "1" signal in excess of 5 volts and a "1" to "0" ratio greater than 7. The shift pulse amplitude was approximately 10 volts and its time duration was approximately 2 micro seconds. The input pulse source amplitude was approximately 5 volts.

The shift register embodying this invention is adaptable to variations of both shift and input pulse potential and duration. Where the amplitude of the input pulses indicating the "1" state is below that required to completely switch the core 10 to the opposite retentive flux level, the core flux indicating the "1" bit state is merely a remnant flux density different from the retentive level defined as the "0" state and operation would be unchanged.

While a particular embodiment of the invention has been shown and described, it should be understood that the invention is not limited thereto, and it is intended in the appended claims to claim all such variations as fall in the true spirit of the present invention.

What I claim as new and desire to secure by Letters Patent of the United States is:

1. A shift register having a plurality of magnetic elements each adapted to represent the two possible states of a binary-coded bit by two distinct reference levels of flux density therein, a primary winding and a secondary winding on each element, a source of voltage pulses, a plurality of impedances, means for connecting said source to the secondary winding of each of said elements through separate impedances, energy storage means coupled intermediate successive elements, said storage means being coupled in parallel with the secondary winding of a preceding element, a discharge circuit for said storage means comprising the primary winding of a succeeding element, and gating means connected in series circuit, said gating means being actuated intermediate the presence of said voltage pulses.

2. A shift register having a plurality of magnetic elements each adapted to represent the two possible states of a binary-coded bit by two distinct reference levels of flux density therein, a primary winding and a secondary winding on each element, a source periodically supplying voltage pulses at a first time period, a plurality of impedances, separate ones of said impedances being connected serially with the secondary winding of each of said elements across said source, input signal means coupled to the primary winding of a first of said elements, rectifying means and charge storage means serially connected across the secondary winding of the first of said elements, gating means, means for serially connecting said charge storage means said gating means and the primary winding of a second of said elements, said gating means being actuated periodically to charge said charge storage means at a second time period.

3. A shift register circuit comprising a plurality of serially arranged bistable magnetic elements, each of said elements having a primary winding and a secondary winding, a source of voltage pulses, means for connecting said secondary windings in parallel across said source, a plurality of charging circuits each comprising a capacitor, an inductance, and a rectifier connected in series circuit, means for connecting one of said charging circuits in parallel with each of said secondary windings, means for discharging the capacitor of each of said charging circuits through the primary winding of the next consecutive magnetic element.

References Cited in the file of this patent

UNITED STATES PATENTS

| | | |
|---|---|---|
| 2,846,669 | McMillan | Aug. 5, 1958 |
| 2,863,138 | Hemphill | Dec. 2, 1958 |
| 2,958,076 | Kelner | Oct. 25, 1960 |